(12) United States Patent
Raspic (10) Patent No.: US 8,826,597 B2
(45) Date of Patent: Sep. 9, 2014

(54) WEATHERPROOF SURROUND FOR SAFELY JETTISONING A REMOVABLE PANEL

(75) Inventor: Nicolas Raspic, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 13/431,078

(22) Filed: Mar. 27, 2012

(65) Prior Publication Data

US 2012/0248713 A1   Oct. 4, 2012

(30) Foreign Application Priority Data

Mar. 31, 2011   (FR) ...................................... 11 00949

(51) Int. Cl.
| | |
|---|---|
| *B64C 1/14* | (2006.01) |
| *B64C 1/32* | (2006.01) |
| *B61D 19/02* | (2006.01) |
| *B60J 10/02* | (2006.01) |
| *B60J 10/00* | (2006.01) |
| *B64C 27/04* | (2006.01) |

(52) U.S. Cl.
CPC ............... *B64C 1/1492* (2013.01); *Y02T 30/30* (2013.01); *B64C 27/04* (2013.01); *B64C 1/14* (2013.01); *B64C 1/32* (2013.01); *B61D 19/023* (2013.01); *B60J 10/02* (2013.01); *B60J 10/0082* (2013.01)
USPC .................... 49/475.1; 244/129.3; 244/129.5; 52/204.597

(58) Field of Classification Search
USPC ........ 49/475.1; 52/204.591, 204.597, 204.71, 52/716.8, 717.01; 244/129.4, 129.5, 244/129.3, 131
See application file for complete search history.

(56) References Cited

U.S. PATENT DOCUMENTS

| | | | | | |
|---|---|---|---|---|---|
| 2,288,329 | A | * | 6/1942 | Smith ....................... | 52/204.597 |
| 2,654,919 | A | * | 10/1953 | Marvin ........................... | 52/208 |
| 2,655,239 | A | * | 10/1953 | Kenlock .................... | 52/204.597 |
| 3,189,143 | A | * | 6/1965 | Adams ............................ | 52/208 |
| 3,435,579 | A | * | 4/1969 | Horgan, Jr. ............... | 52/204.597 |
| 3,604,171 | A | * | 9/1971 | Perilstein ................. | 52/204.597 |
| 4,707,958 | A | | 11/1987 | Armbruster | |
| 5,358,764 | A | * | 10/1994 | Roberts et al. .................. | 428/31 |

(Continued)

FOREIGN PATENT DOCUMENTS

| | | |
|---|---|---|
| DE | 916501 A | 8/1954 |
| DE | 1715159 U | 1/1956 |

(Continued)

OTHER PUBLICATIONS

Decision No. 2003/16/RM of the Executive Director of the Agency of Nov. 14, 2003 on certification specification for large rotorcraft. Published Nov. 14, 2003. European Aviation Safety Agency. 124 pages.

(Continued)

*Primary Examiner* — Katherine Mitchell
*Assistant Examiner* — Abe Massad
(74) *Attorney, Agent, or Firm* — Brooks Kushman P.C.

(57) ABSTRACT

A weatherproof surround, for a jettisonable panel (5) of a vehicle (1) such as a helicopter, possesses four confinement flanges (17-20) integrally formed with a projecting ridge for spring-clipping a corresponding locking strip. Longitudinal foldable shoulders connect the confinement flanges (17-20) to a central trunk (13). Each confinement flange (17-20) can be folded back through pivot angle (31) of at least 90°.

20 Claims, 5 Drawing Sheets

(56) References Cited

U.S. PATENT DOCUMENTS

| | | | |
|---|---|---|---|
| 5,826,824 A * | 10/1998 | Martin et al. | 244/129.3 |
| 6,164,715 A * | 12/2000 | Mosaner | 296/146.1 |
| 6,308,918 B1 | 10/2001 | Ferrier | |
| 7,780,116 B2 | 8/2010 | Payen | |
| 8,052,094 B2 | 11/2011 | Roesch | |
| 8,113,460 B2 | 2/2012 | Roesch | |
| 8,181,901 B2 | 5/2012 | Roesch | |
| 8,312,681 B2 | 11/2012 | Mouton | |

FOREIGN PATENT DOCUMENTS

| | | | |
|---|---|---|---|
| DE | 2233525 A | 1/1974 | |
| DE | 2433525 A1 | 1/1976 | |
| DE | 20217925 U1 | 3/2003 | |
| EP | 0175981 A2 | 4/1986 | |
| EP | 0249560 A1 | 12/1987 | |
| EP | 0748710 A1 | 12/1996 | |
| FR | 1390412 A | 2/1965 | |
| FR | 2205622 A | 5/1974 | |
| FR | 2548256 A1 | 1/1985 | |
| FR | 2766156 A1 | 1/1999 | |
| FR | 2858950 A1 | 2/2005 | |
| FR | 2896768 A1 | 8/2007 | |
| FR | 2916418 A1 | 11/2008 | |
| FR | 2916419 A1 | 11/2008 | |
| FR | 2916420 A1 | 11/2008 | |
| FR | 2935347 A1 | 3/2010 | |

OTHER PUBLICATIONS

Search Report and Written Opinion; Application No. FR 1100949; dated Nov. 14, 2011.

* cited by examiner

WEATHERPROOF SURROUND FOR SAFELY JETTISONING A REMOVABLE PANEL

CROSS REFERENCE TO RELATED APPLICATIONS

This application claims priority to FR 11 00949 filed on Mar. 31, 2011, the disclosure of which is incorporated in its entirety by reference herein.

BACKGROUND OF THE INVENTION (1) Field of the Invention

The invention relates to the technical field of weatherproof surrounds or tight sealing frames, for removable emergency panels, for walls of vehicles.

(2) Description of Related Art

The invention is useful to various types of vehicle, even if it originates in the aviation industry. For example, the invention may be applied to rotary-wing aircraft.

In non-limiting manner, the invention may be applied to a helicopter in which, for example, the wall is part of a fuselage. The invention may also be applied to high-speed and long-range helicopters of the "hybrid" type, e.g. such as described in Documents FR 2 916 418, FR 2 916 419, or FR 2 916 420.

In another example, the rotary-wing aircraft is a drone that is unmanned, being flown from a remote pilot station, and the removable panel can then typically close off an emergency hatchway giving access into its fuselage. In the embodiments for aircrafts, the wall or fuselage may be as described by Document FR 2 896 768.

Consequently, the term "removable panel" of a wall is used herein to designate various types of structure, in particular in the form of windows or of wall elements of the vehicle. Such a removable panel may thus be at least partially opaque and/or at least partially translucent, or genuinely transparent.

The term "jettisonable panels" is used if such a panel is said to be "removable" or ejected in an "emergency" or "escape" situation, so that, so long as the vehicle is in the normal operating state, said panel is fastened rigidly (i.e. held securely) in the wall. It can then be considered to be an "integrated" element of the fuselage or to be trim therefor.

Conversely, in an emergency, the removable emergency panel can be disunited and separated from the remainder of the wall of the vehicle, so as to open up access to the inside of the vehicle and/or to the outside thereof.

It can therefore be understood that a "weatherproof surround" for such a removable emergency panel is a structure that connects said removable panel to the wall that surrounds it, when the vehicle is in its normal operating state. In such a state, the panel is connected via the weatherproof surround to the wall of the vehicle, sufficiently rigidly and hermetically to satisfy the conditions under which the vehicle is operated.

If the panel is removable in the event of an emergency, such weatherproof surrounds (optionally together with their holding and detaching structures) may be referred to as "jettison seals". Other commonly used weatherproof surrounds that may be referred to as "seals with unlocking key and strip" or "handled seals" are mentioned below.

The technical problem lying behind the invention is described below.

Firstly, it is desirable for the safety performance of existing jettison seals to be improved significantly, in particular as regards ease of jettisoning (i.e. ejecting).

This involves improving prevention of any unacceptable malfunctioning that might be encountered with existing jettison seals, and also keeping up with the increased technical constraints to which modern aircraft are subjected.

For example, for high-speed and long-range "hybrid" helicopters, the following constraints are being made more stringent:

strength of the materials (both static and dynamic strength);

dimensional constraints, with windows having larger areas;

in a normal operating state, staying in place even with removable panels that are heavier (e.g. luxury or "VIP" windows having insulating multiple glazing);

resistance (e.g. to pressure) at high speeds;

temperature, e.g. at high speeds and at high flight altitudes; and on-board weight, with "weight-paring" being draconian on modern aircraft.

It is worth briefly recalling the applicable regulations relating to safety performance of existing jettison seals designed for rotary-wing aircraft. Currently, those regulations are defined by the Nov. 14, 2003 Final Decision EC2003/16/RM by the European Aviation Safety Agency on certification specifications for large rotorcraft. That Decision is often referred to as "CS-29".

In that Final Decision EC2003/16/RM, paragraph CS-29.809 concerns emergency exit arrangement.

In particular, that Decision provides as follows in its paragraphs:

(a) each emergency exit must consist of a movable door or hatch in the external walls of the fuselage and must provide an unobstructed opening to the outside;

(b) each emergency exit must be openable from the inside and from the outside;

(c) the means of opening each emergency exit must be simple and obvious and may not require exceptional effort;

(d) there must be means for locking each emergency exit and for preventing opening in flight inadvertently or as a result of mechanical failure;

(e) there must be means to minimize the possibility of any emergency exit jamming in a minor crash landing as a result of fuselage deformation under ultimate inertial forces (see CS-29.783).

In addition, paragraph AC 29-2C §29.809 of that Decision provides, in particular, as follows:

For the procedures, the effort required to open the emergency exit, as evaluated by conducting the tests (tests as defined in §29.8070 must lie within the range 40 pounds (18.14 kilograms (kg) to 50 pounds (22.68 kg), and it is recommended that a person of slight stature, such as a female in range 90 pounds to 100 pounds, be used for the exit opening tests and demonstrations. In any case, the average load required to operate the exit release mechanism and open the exit should not exceed 50 pounds (22.68 kg), and the maximum individual load of a test series should not exceed 55 pounds (24.95 kg).

In addition, paragraph AC 29 §29.803(d) of that Decision provides, in particular, that with rotary-wing aircraft having emergency exits, it must be possible for the maximum seating capacity (including both passengers and crew members as required by flight regulations) to be evacuated from the aircraft to the ground within 90 seconds.

Although generally satisfactory, current jettison weatherproof surrounds would benefit from improvements regarding two points mentioned below. Also, such surrounds might complicate certification, or indeed compromise the safety desired for future aircraft that have flight characteristics and/ or wall structures that are more constraining than currently.

If the weatherproof surround is a jettison seal with a unlocking strip or "handled seal", changes in the structural characteristics of the removable emergency panel (in its weight, in its dimensions, in its physical properties, etc.) can have direct consequences on the opening operation and thus on evacuation (within a maximum time of 90 seconds) as defined by the currently applicable regulations.

Evacuation should be operational over the entire range of temperatures to which the aircraft might be exposed when in service.

In this context, it would be desirable for jettison weatherproof surrounds to be certified as emergency exits without having to make provision for some other heavier wall structure to be jettisoned, typically when the removable panel is a window and the wall structure that holds it in the fuselage is a door. For example, when the panel is a door window, it is problematic that it is not possible for the window to be certified as an emergency exit, and that the entire door in which the window is installed must be certified.

In practice, the technological background of the invention does not make it possible to achieve these objects.

In addition to above-mentioned Documents FR 2 896 768, FR 2 916 418, FR 2 916 419, or FR 2 916 420, and Final Decision EC2003/16/RM of Nov. 14, 2003, mention may be made of other documents from the state of the art.

Other documents relating to panel surrounds are discussed below.

Document FR 1 390 412 describes opening panels of a vehicle. That document proposes increasing the deformability of a seal, but the angles that it is possible to achieve (FIG. 6) are limited.

Document FR 2 205 622 describes a seal for surrounding a window pane with elongate beads, a slot, and a fastener hinge. That document proposes increasing the deformability of a seal, but the angles that it is possible to achieve (FIG. 2) are limited.

Document DE 171 519 describes a window surround making jettisoning possible, with, on the inside face, means having a handle for cutting the surround.

Document DE 22 33 525 describes a seal for surrounding a window with an outside slot in which a fastener hinge is received. That document proposes a seal having a deformation angle that is limited in amplitude, with such deformation being possible on only one face of the seal.

Document DE 916 501 describes a single seal provided with a first extreme zone and with a second extreme zone that are connected together via an intermediate zone. That single seal does not appear to be applicable to an aircraft, in particular due to aerodynamic stresses.

Document DE 202 17 925 describes an emergency ejection window for a railcar or for a bus. That document does not describe any means making it possible, as required in the field of aviation, to combine holding the window pane in place under in-flight aerodynamic forces while also enabling the window to be ejected under maximum loads. That document describes a complex handle-and-linkage device to be pulled in order to eject the window pane.

Document EP 0 249 560 describes a channel-section member that fits over the edge of a window pane and that co-operates with a closure section member.

Document EP 0 175 981 describes a gasket, for fastening a window against the border of an opening in a motor vehicle. That gasket is provided with a reception slot for receiving a window pane, and with an adapter element for fastening to the border of the opening in the motor vehicle. Together, the gasket and the adapter element constitute a securing seal. That document does not describe a removable emergency panel for an aircraft, or how to enable such a removable panel to withstand in-flight thermal expansion, or how to procure stiffness guaranteeing that such a panel is held in position in spite of the aerodynamic forces to which it is subjected in flight, while also remaining weatherproof. In addition, the large windows of an aircraft must be jettisonable in order to allow passengers to evacuate in the event of incidents. This function is not described by Document EP 0 175 981. That document thus does not describe jettisoning large-size windows that would open up openings in the fuselage of the aircraft, such openings being particularly useful if the conventional accesses of the aircraft are blocked.

Document EP 0 748 710 describes a device for unfastening a window pane in an emergency, for a rail vehicle. A window pane is held in position via a peripheral cord that must be cut in order to release the window pane to be unfastened and in order to evacuate the occupants. That unfastening device is heavy and complex, and comprises numerous assembled components. In addition, that unfastening device requires the seal or the cord to be destroyed in order to unfasten the window pane.

Document FR 2 858 950 relates to a sealing module for sealing a window pane that is fixed and that is therefore, a priori, not suitable for being removed.

Document FR 2 548 256 describes two elements, namely a molding and a glazing bead that co-operate to form two slots. Two lips of the molding define one slot while a lip of said molding co-operates with a lip of the glazing bead to form the second slot.

Document FR 2 766 156 describes a window pane surround making it possible to jettison a window. Pullable cutting means are provided on at least a portion of the perimeter of the window pane for the purpose of cutting the surround into a plurality of portions, thereby disuniting the window pane from the support. That seal is dedicated exclusively to a single given model (geometrical shape and size) of window. Each model of window requires a specific seal to be manufactured, thereby giving rise to relatively high costs. Once the core of the seal has been cut, the surround cannot be reused. In order to accommodate differential expansion of the carrier structure and of the window, it would be necessary to make the seal excessively big, to the detriment of its weight and of its visual appearance.

Document FR 2 935 347 describes a weatherproof surround for a large window of a rotary-wing aircraft. That surround includes a first weatherproofing seal and a second weatherproofing seal, removable holding means, with two rigid outer webs that clamp the seals and the window onto the carrier structure in the mounted state.

BRIEF SUMMARY OF THE INVENTION

The main objects of the invention are given below.

One of these objects is to make it easier, quicker, and safer to perform the manipulations for evacuation from the carrier structure.

In addition, it would be convenient for the weatherproof surround to be reusable after evacuation, in other words for it to be possible to disassemble it and to reposition it in reversible manner. For example, the invention should make it possible for two component parts of the weatherproof surround merely to be disunited from each other (i.e. to be unclipped from each other in non-destructive manner), so as to separate the removable emergency panel from its receiving wall easily and without damaging the panel or the wall, given that it would then be possible to reunite the same elements of the weatherproof surround (i.e. to fasten them together again rigidly), so as to put the panel back into a normal operating state in its receiving wall.

Such a reusable and reversibly removable weatherproof surround would offer two advantages: firstly, the advantage of facilitating maintenance of the vehicle and replacement of the surround or of the panel if necessary, and secondly the advantage of contributing to evacuation manipulations that are easy, fast, and safe.

Another object of the invention is to make sure the removable emergency panels are consistent with the applicable certification requirements, e.g. for rotary-wing aircraft. It is emphasized that such requirements concern, in particular, the following:

maximum evacuation time, i.e. maximum time for going from a mounted state (or a normal operating state), in which the removable emergency panel is in its carrier structure on which it is to be used, to an evacuation state (emergency state), in which said window is released from the carrier structure (so as to procure a passage towards the outside);

maximum forces for holding in the mounted state, and also maximum forces to be exerted for the evacuation manipulations; and temperature ranges to which the carrier structures are exposed, and thus to which the weatherproof surrounds of the removable emergency panels in question are exposed.

These high requirements for holding the removable emergency panels in the mounted state are difficult to reconcile with the maximum forces that should result in the evacuation state.

An object of the invention is to propose a weatherproof surround suitable for securing various models of removable emergency panel, and optionally panels of large size, to a carrier structure of an aircraft, while also imparting increased functionality to said surround, and at lower cost.

To this end, characteristics of various aspects of the invention are defined by the claims.

In one aspect, the invention provides a peripheral seal designed for a weatherproof surround for a jettisonable panel that is jettisonable from a bay in a wall of a vehicle. This peripheral seal is of the generally tubular type and extends mainly along a longitudinal axis, and said peripheral seal comprises at least:

a central trunk of substantially prismatic shape, mainly elongate along the longitudinal axis so as to form two butt ends, and adaptable by longitudinal shaping to match an inside opening profile of the bay in the vehicle on which it is to be used;

a top reception slot and a bottom reception slot, which slots extend from one butt end to the other butt end of the central trunk, substantially along a longitudinal elevation midplane;

transversely on either side of the top reception slot, respectively an inside top confinement flange and an outside top confinement flange, and transversely on either side of the bottom reception slot, the peripheral seal having respectively, an inside bottom confinement flange and an outside bottom confinement flange;

defined between the inside top confinement flange and the inside bottom confinement flange, an inside insertion recess for an inside locking strip, and, defined between the outside top confinement flange and the outside bottom confinement flange, an outside insertion recess for an outside locking strip;

on each confinement flange, a projecting ridge for spring-clipping one of the locking strips, which ridge extends substantially in longitudinal elevation, these projecting spring-clip ridges being arranged in pairs of mutually facing ridges on either side in elevation of respective ones of the insertion recesses; and connecting each of the four confinement flanges to the central trunk, a respective longitudinal foldable shoulder.

A characteristic provides a pivot angle of at least 90° in a plane that is perpendicular to the longitudinal axis, through which angle at least one confinement flange can be folded back by the foldable shoulder deforming towards a concave portion of the corresponding insertion recess, from a normal operating state to a release state for releasing the jettisonable panel. In the release state, the projecting ridge of the folded-back confinement flange is in abutment against an abutment section of the corresponding insertion recess, which abutment section is situated substantially between the central trunk and the likewise inside or outside confinement flange that is opposite from the folded-back confinement flange.

Another characteristic makes provision for the peripheral seal to satisfy a relationship relating: a maximum elevation half-dimension $D2$ of the peripheral seal; a maximum transverse half-dimension $D4$ of the peripheral seal; and a half-dimension $D3$ out of the insertion recess in elevation of said peripheral seal. The half-dimension $D3$ out of the recess extends between a distal end that is either a top end or a bottom end of a corresponding confinement flange that is opposite in elevation from the central trunk and a distal end of a projecting ridge formed by said confinement flange. A relationship between elevation half-dimension $D2$, transverse half-dimension $D4$, and half-dimension $D3$ outside the recess is such that: $\frac{1}{2}D2 \geq D3$ and $\frac{1}{2}D2 \geq D4$.

Yet another characteristic makes provision for the peripheral seal to satisfy a relationship such that $D2 \geq D5$, where $D2$ is a maximum elevation half-dimension of the peripheral seal and $D5$ is a maximum elevation dimension of a reception slot, said dimension $D5$ being less, substantially by 5% to 10% of $D2$, than a minimum elevation dimension or distance $[P1-P2]$ of an insertion recess, between the two projecting ridges of said insertion recess.

According to a characteristic, a minimum distance $D1$ of the central trunk, between an abutment section of the insertion recess and an end-wall surface of the transversely narrower reception slot of the peripheral seal (which reception slot is either the bottom slot or the top slot) is no greater than a transverse dimension $D6$ of said end-wall surface of the narrower reception slot, and/or the minimum distance $D1$ is no greater than one half of a transverse dimension $D6$ of an end-wall surface of the other reception slot, which other slot is either the top slot or the bottom slot, is the transversely wider slot, and is opposite in elevation from the narrower reception slot.

A characteristic provides that, substantially in the middle in elevation of at least one insertion recess, namely either the inside recess or the outside recess, the central trunk is provided with a clearance channel, extending longitudinally from one butt end to the other of the central trunk, said clearance channel having, in a transverse elevation plane, a concave rounded profile that is substantially defined by a radius of curvature $R1$. The dimension of said radius of curvature $R1$ satisfies the following relationship: $[P3-P4] \geq 3 \times R1$, where $[P3-P4]$ is an elevation distance between a top cusp $P3$ and a top cusp $P4$ of an insertion recess that is either the inside or the outside recess, in which insertion recess said clearance channel is disposed, so that, in the release state, the cusps, respectively the top cusp and the bottom cusp, remain significantly spaced apart from each other while the spring-clip ridge of said insertion recess is in abutment against the corresponding abutment section.

In an embodiment, at least one projecting ridge, respectively the top ridge or the bottom ridge, of the same insertion recess is of outside profile, as seen in transverse elevation section, that is complementary to a respectively bottom or top reception setback. This reception setback of the insertion recess is located at the location of the corresponding abutment section so as to space said abutment section apart from said projecting ridge, and thus so as to make it possible for a pivot angle that is "increased", e.g. from 95° to 105°, to be procured by means of a "compact" release state.

Another characteristic makes provision for at least one component material of said peripheral seal to be chosen from the following materials (Table No. 1):

| K01 | NF L 17 151 | NF L 17 250 5 | NF L 17 261 | NF L 17 261 |
|---|---|---|---|---|
| K02 | Silicone elastomers Class 51 | Silicone rubbers Class 50 D 8 | Fluorosilicone rubbers Class 61 | Fluorosilicone rubbers Class 61 |
| K03 | 51 A 8 | 50 D 8 | 61 D 7 | 61 D 8 |
| K04 | 80 ± 5 | 80 ± 5 | 70 ± 5 | 80 ± 5 |
| K05 | 5 | 5 | 6 | 5.5 |
| K06 | 60 | 125 | 125 | 120 |
| K07 | / | 40 | 45 | 50 |
| K08 | / | −60 | −55 | −55 |
| K09 | −30° C. to +100° C. | −55° C. to +225° C. | −55° C. to +180° C. | −55° C. to +180° C. | where:

K01 indicates the designation of said material in a French Standard ("Norme Française" or "NF");

K02 indicates the name of the material;

K03 indicates a code for said material;

K04 indicates a Shore A hardness value for said material;

K05 indicates a minimum tensile strength value (in megapascals (MPa)) for said material;

K06 indicates a minimum breaking elongation value (in %) for said material;

K07 indicates a residual deformation after compression (after 70 hours at 100° C. in air, in %) for said material;

K08 indicates a non-brittle limit temperature value (in ° C.) for said material; and K09 indicates a range of temperatures for prolonged use.

In an embodiment of the peripheral seal, said peripheral seal is a one-piece part, made by injection-molding and/or by extrusion, and made of a material that includes a silicone rubber of class higher than 50 in compliance with a French Standard (NF), e.g. said material is the material designated by NFL17.250-5 or NFL17.261.

In another aspect of the invention, it provides a weatherproof surround for a jettisonable panel that is jettisonable from a bay in a wall of a vehicle. Said weatherproof surround is substantially prismatic, mainly elongate along a longitudinal axis so as to form two butt end faces, and adaptable by longitudinal shaping to match an inside opening profile of the bay in the vehicle in which it is to be used, said weatherproof surround having at least one peripheral seal as defined above.

An embodiment provides that the peripheral seal is substantially symmetrical about a longitudinal elevation midplane, or indeed about a longitudinal transverse plane. Each of the two locking strips, respectively the inside strip and the outside strip, having a profile that is substantially complementary to the profile of the corresponding insertion recess, e.g. having a profile that is symmetrical about said longitudinal transverse plane.

In an embodiment of said weatherproof surround, the peripheral seal is substantially asymmetrical about a longitudinal elevation midplane and/or about a transverse elevation midplane. For example, the asymmetrical peripheral seal is formed with an inside insertion recess in which a top projecting ridge is closer than the bottom projecting ridge of the same inside insertion recess, while an outside insertion recess has a bottom projecting ridge that is closer than the top projecting ridge of the same insertion recess, two locking strips, respectively an inside strip and an outside strip, being of profiles substantially complementary to the corresponding insertion recesses, typically with transverse elevation profiles that are rounded, respectively with a longer bottom portion and with a longer top portion.

In an embodiment of said weatherproof surround, at least one locking strip is made as a single piece by injection-molding and/or by extrusion, and made of a material having a Shore A hardness value that is greater than 70 or indeed greater than 80 in compliance with a French Standard (NF). For example, said material is the one designated by NFL17.250-5 or NFL17.261.

In an embodiment, at least one locking strip has a concave core cavity in which at least one rigid element is disposed. For example, a rigid element in the shape of a blade or the like, incorporated in the concave core cavity of said locking strip, substantially from one butt end face to the other butt end face of said weatherproof surround.

In an embodiment, at least one locking strip has a "peripheral" concave core cavity, extending from one butt end face to the opposite butt end face of the weatherproof surround, while a plurality of rigid elements are disposed in reception sections that are distinct from said core cavity, which sections are distributed around its periphery. For example, reception sections are arranged in substantially rectilinear portions of the concave core, while curved portions, typically corresponding to corners of jettisonable panel, are exempt from rigid elements. In particular, at least one of the curved portions of the core cavity coincides with an initiator zone for initiating jettisoning of the window.

In yet another aspect of the invention, it provides a vehicle provided with at least one wall that defines a bay for a jettisonable panel, said panel being connected to said wall by a weatherproof surround. This weatherproof surround has at least one peripheral seal as defined above.

According to a characteristic, the vehicle is an aircraft, e.g. a rotary-wing aircraft. For example, the wall is part of a fuselage or of a door, the removable panel being a window or a hatch or the like, and the weatherproof surround is interchangeable, or indeed forms a weatherproof surround for replacing a distinct surround.

BRIEF DESCRIPTION OF THE SEVERAL VIEWS OF THE DRAWINGS

The invention and its known advantages appear in more detail in the following description of embodiments given merely by way of illustration, and with reference to the accompanying drawings.

DETAILED DESCRIPTION OF THE INVENTION

In the drawings, in which like elements are given the same reference numbers, three axes are shown that are mutually orthogonal.

An "elevation" axis Z corresponds to the heights and thicknesses of the structures that are described: the terms "top" and "bottom" ("SUP" and "INF", e.g. in FIGS. 6 to 10) are used with reference to this axis. By way of simplification, this axis Z corresponds to the vertical directions of the sheets, e.g. in FIGS. 6 to 10.

Another axis X is said to be "longitudinal" and corresponds to the lengths or main dimensions of the structures that are described. By way of simplification, this axis X is sometimes referred to as "horizontal". For example, in FIGS. 6 to 10, this axis X corresponds to the perpendicular to the planes of the sheets.

Another axis Y is said to be "transverse" and corresponds to the widths or lateral dimensions of the structures that are described. The term "side" is used with reference to this axis. By way of simplification, this axis Y is sometimes considered to be "horizontal". In some figures, the concepts of inside ("INT", e.g. left in FIGS. 6 to 10) and of outside ("EXT", e.g. right in FIGS. 6 to 10) are defined along the transverse axis Y.

Figures 5, 6:
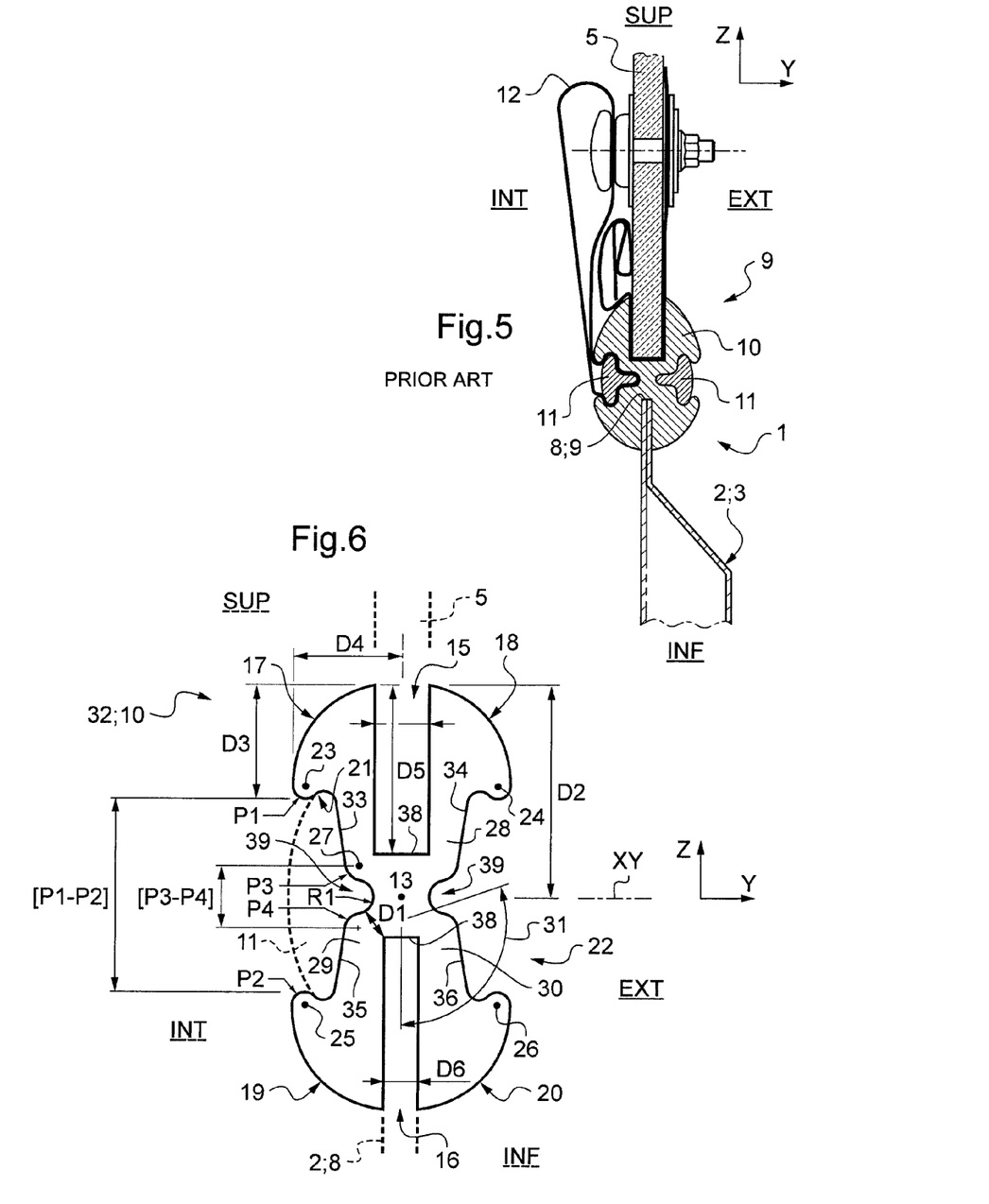
FIG. 5 is a diagrammatic view of the known weatherproof surround of FIG. 4, in section on a transverse elevation plane, defined by line V-V in FIG. 4.
FIG. 6 is a diagrammatic section view of an embodiment of a weatherproof surround peripheral seal of the invention, in section on a transverse elevation plane, said peripheral seal being of the type said to be "symmetrical" about a longitudinal elevation plane, and shown in the mounted state.

The axes X and Y jointly define an intersecting longitudinal plane (a plane perpendicular to the plane of the sheet in FIG. 6).

Figures 1, 2, 3, 4:
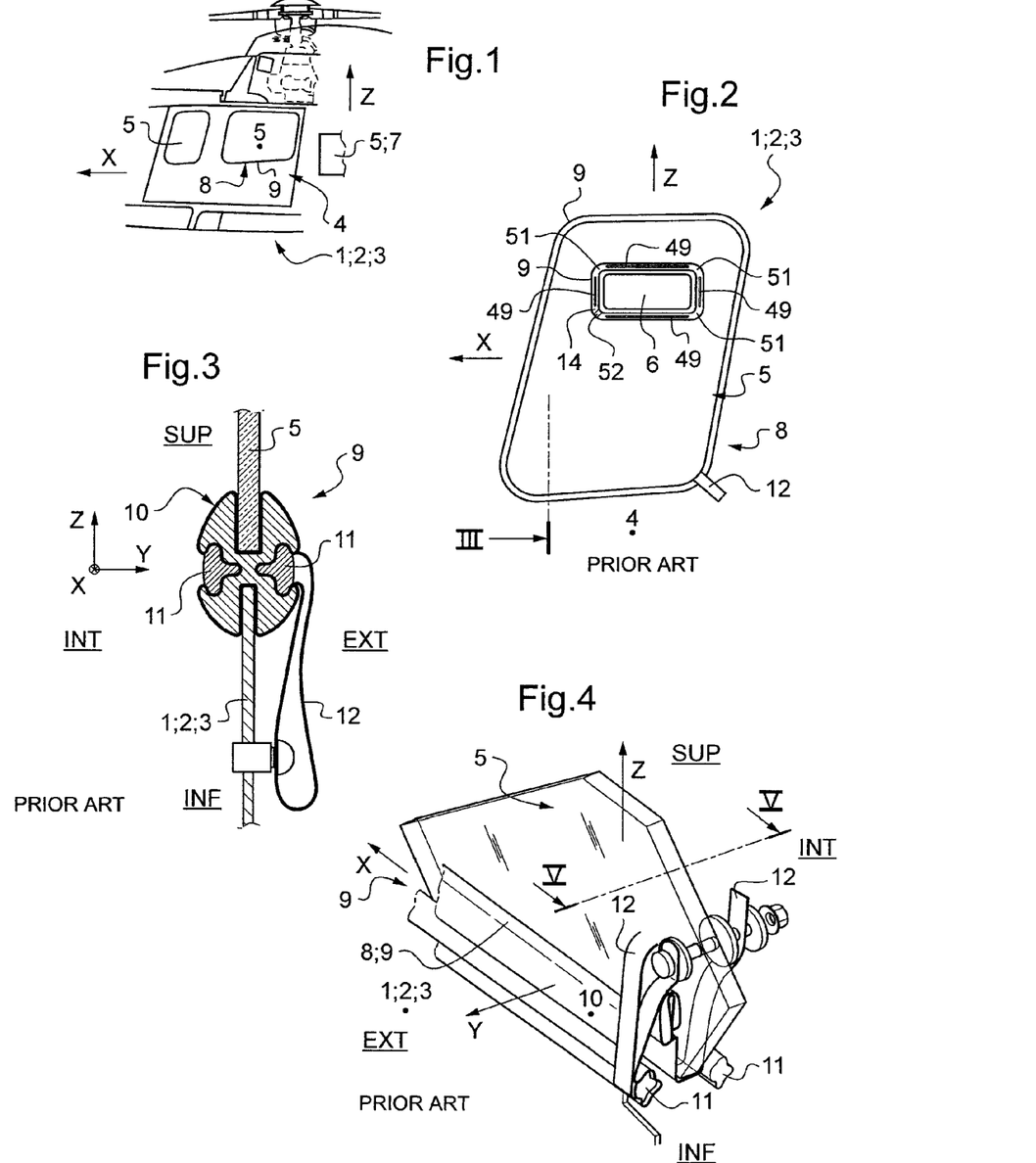
FIG. 1 is a fragmentary diagrammatic view of a vehicle of the rotary-wing aircraft type, namely a helicopter or a drone, equipped with at least one removable emergency panel having a weatherproof surround, of the invention, and shown in a longitudinal elevation plane so that the removable panel extends substantially in the plane of FIG. 1.
FIG. 2 is a diagrammatic view of a known opaque removable emergency panel having a weatherproof surround, shown in a longitudinal elevation plane, and extending in the plane of FIG. 2.
FIG. 3 is a diagrammatic section view of a known weatherproof surround, shown in a transverse elevation plane defined by arrow III in FIG. 2, with two jettison strips, one of which is surrounded by an extraction strap, a wall bay, and a transparent removable emergency panel of the window type.
FIG. 4 is a fragmentary diagrammatic perspective view of a known weatherproof surround, similar to the weatherproof surround of FIG. 3, with two extraction straps for extracting inside and outside jettison strips, a fuselage wall and a window forming a transparent removable emergency panel.

In FIG. 1, the numerical reference 1 generally designates a vehicle 1 constituting one of the aspects of the invention. This vehicle 1 is an aircraft. In non-limiting manner, the invention is described in its application to rotary-wing aircraft and in particular to helicopters. The invention may be applied to manned rotary-wing aircraft and/or to rotary-wing drones.

The vehicle 1 of FIG. 1 is a helicopter that has at least one wall 2, e.g. that is part of a fuselage 3, as can be seen more clearly in FIG. 5. In FIG. 1, a hinged door 4 is part of the wall 2. Said wall 2 has one or more removable panels 5.

In FIG. 2, the removable panel 5 is opaque, with a transparent portion 6. In FIG. 4, the removable panel 5 is entirely transparent because it is a window pane. In FIG. 1, a rear removable panel 5 is totally opaque so as to form a hatch 7 that is installed directly in the wall 2, i.e. in the fuselage 3.

Each removable panel 5 is mounted in the wall 2 of the vehicle 1, when the vehicle is in a normal operating state, in which the removable panel 5 is in the mounted position.

More precisely, when the vehicle 1 is in a normal operating state, the removable panel 5 is fastened rigidly to the aircraft 1, in a bay 8 having a periphery 9 that is clearly visible in FIGS. 4 and 5. Naturally, the removable panel 5 is of a shape that is substantially complementary to (and smaller than) the shape of the bay 8. This bay 8 is of significantly larger dimensions so that the removable panel 5 can be received therein, in its mounted position.

Such panels 5 may also be referred to as "jettisonable panels" when they can serve as emergency exits or entrances, once they have been disunited and separated from the wall 2, i.e. once they are in a release state.

Going from the normal operating state to the release state is achieved by acting on a weatherproof surround 9 that fits the inside of the bay 8 and the outside of said panel 5.

As in the vehicles of FIGS. 1 to 5, the weatherproof surround 9 is formed conventionally firstly of a peripheral seal 10 and secondly of a pair of locking strips 11. These locking strips 11 are mounted in the peripheral seal 10 so as to lock it in the normal operating state.

It can be seen clearly in FIG. 4, in particular, that a peripheral seal 10 is an elongate element, of generally "tubular" shape, i.e. of transverse elevation section (plane YZ) that is relatively constant, with length dimensions (axis X) considerably larger than its dimensions in cross-section.

FIG. 3 shows a known weatherproof surround 9 with two locking strips 11, one of which (on the right) is surrounded by an extraction strap 12, and a "jettisonable", i.e. emergency, removable panel that is transparent, being of the window type and that is fitted in a bay 8 in a wall 2.

In FIGS. 3 to 5, it can be seen that the known locking strips 11, seen in cross-section on a transverse elevation plane are generally cross-shaped sections, with four branches (each strip having longitudinal and perpendicular branches that are interconnected), the branches being relatively "thin", i.e. "narrow", in the manner of blades. The complementary concave shapes for receiving these branches are cavities in the form of deep and narrow grooves.

Various embodiments of the invention are described below with reference to FIGS. 6 to 13.

Firstly, it should be noted that in most of the embodiments of the invention, the weatherproof surround 9 is interchangeable with, or indeed forms a substitute weatherproof surround 9 for a distinct surround previously mounted in the bay 8.

By comparing the profiles of these weatherproof surrounds 9 of the invention, it can be seen that their portions via which they are connected to the bay 8 and to the jettisonable panel 5 are similar to profiles of the known surrounds 9, e.g. shown in FIGS. 3 to 5.

Figure 7:
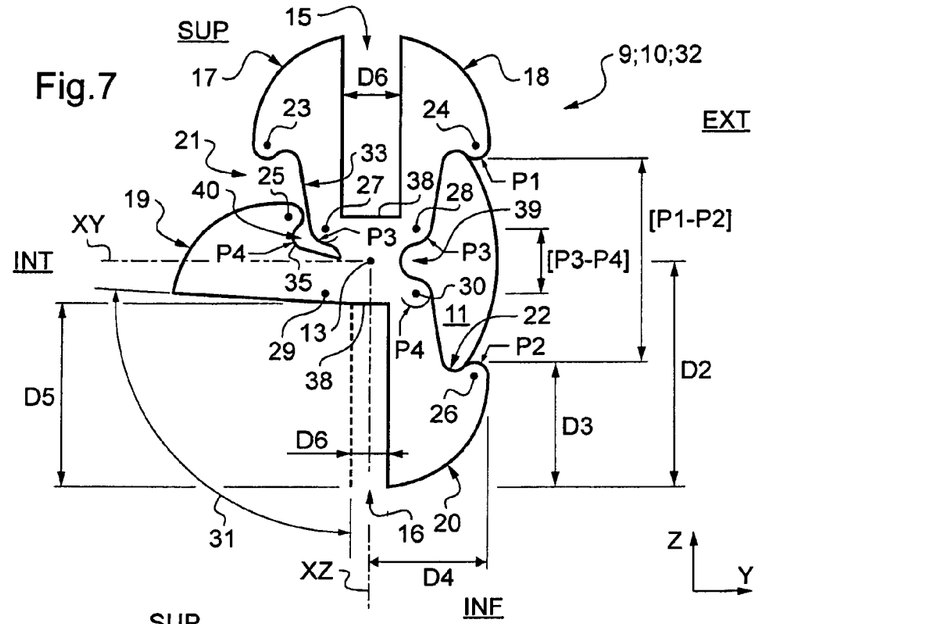
FIG. 7 is a diagrammatic view that includes the embodiment of FIG. 6 and shows a weatherproof surround of the invention, in section on a transverse elevation plane, with, at the bottom and on the left, a movable bottom inside confinement flange shown in the folded-back position (release state), in which it is folded back through a "medium" opening angle (close to an intersecting longitudinal plane, e.g. through an amplitude of 95°), in particular with a view to evacuation; while on an outside side of the weatherproof surround, a "wide" locking strip (which is solid and in one-piece in this example) is mounted in said surround, the confinement flanges then being in the normal operating state.
Figure 8:
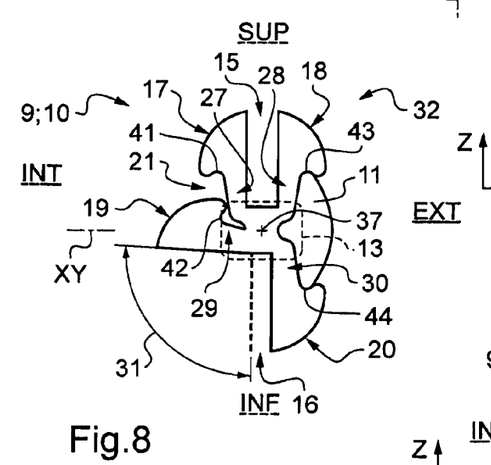
FIG. 8 is a diagrammatic view similar to the FIG. 7 view, but in an embodiment of the invention in which the pivot angle is about 100.
Figure 9:
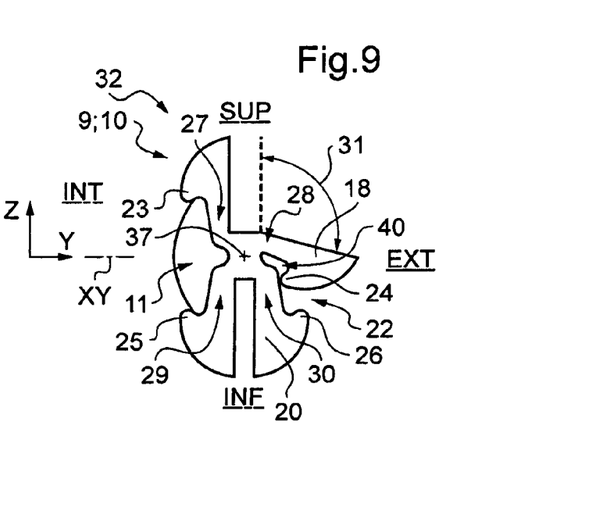
FIG. 9 is a diagrammatic view of another "symmetrical" embodiment of a weatherproof surround of the invention, having an "increased" opening angle (significantly beyond the intersecting longitudinal plane, e.g. with an amplitude of 105°), in section on a transverse elevation plane, with at the top right, a top outside movable confinement flange shown in the folded-back position (release state), while on an inside side a locking strip remains mounted in said weatherproof surround.
Figures 10, 11:
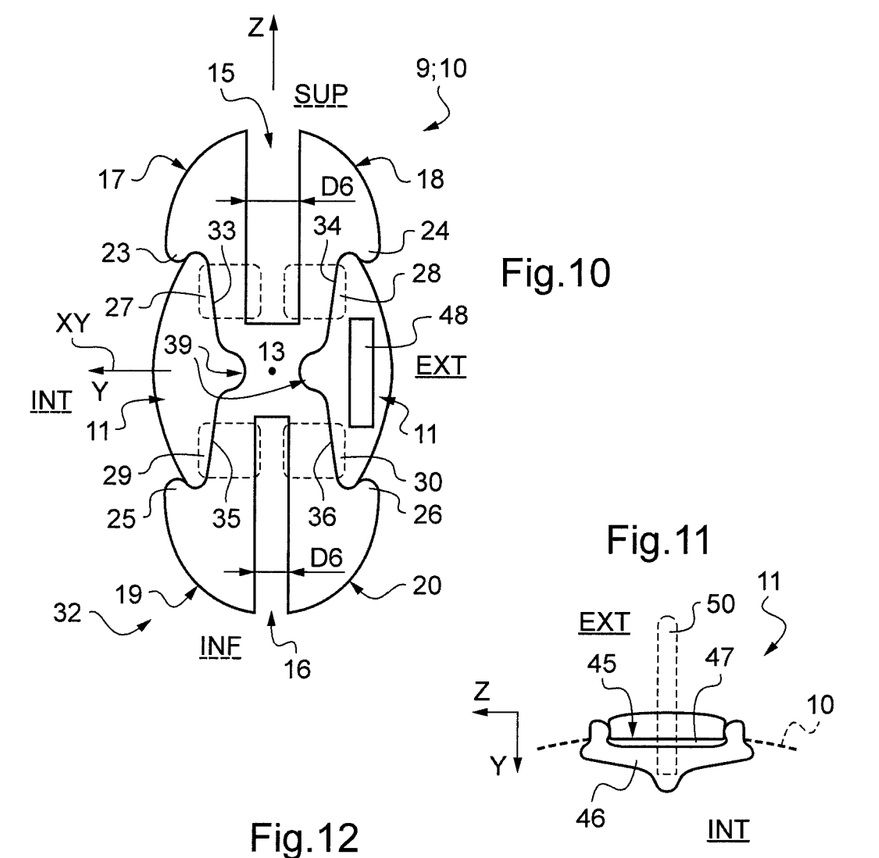
FIG. 10 is a diagrammatic view of another "symmetrical" embodiment of a weatherproof surround of the invention, having an "increased" opening angle (significantly beyond the intersecting longitudinal plane, e.g. with an amplitude of 105°), in section on a transverse elevation plane, with at the top right, a top outside movable confinement flange shown in the folded-back position corresponding to an evacuation state, a one-piece "wide" locking strip mounted on the inside of said weatherproof surround; an outside locking strip is formed of a synthetic material molded directly over a blade-forming rigid element so as to form a locking strip without any reception sections.
FIG. 11 is a diagrammatic view of an embodiment of a locking strip for holding a weatherproof surround of the invention, in section on a transverse elevation plane, said locking strip having at the bottom an inside concave half-ring or "half-strand" having a longitudinal channel and outside ridge rims having fastener means acting by spring-clipping, while at the top, the locking strip has an outside convex other half-ring having top/bottom faces provided with fastener means acting by clipping, said outside convex other half-ring being assembled in a manner locally complementary to the inside concave half-ring.
Figure 14:
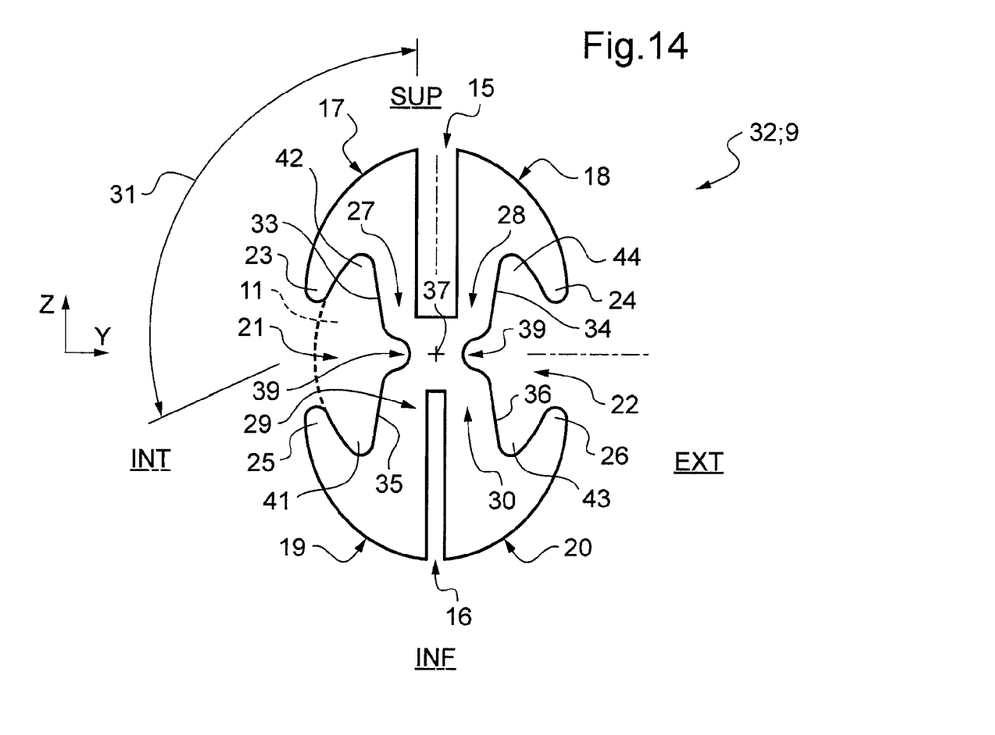
FIG. 14 is a diagrammatic section view of an embodiment of a weatherproof surround peripheral seal of the invention, in section on a transverse elevation plane, with, on each confinement flange, a projecting ridge of outside profile complementary to the inside profile of a reception setback located at a corresponding abutment section of the insertion recess.

There follows a description of the peripheral seal 10, an embodiment of which is shown in FIG. 6. In the figures, the peripheral seal 10 is unitary, i.e. it is made as a single piece, and is typically made by injection-molding or by extrusion. This peripheral seal 10 comprises at least:

a central trunk 13, outlined in dashed lines in FIG. 8; this central trunk 13 is of substantially prismatic shape, and mainly elongate along the longitudinal axis X so as to form two butt ends 14 (see FIGS. 2 and 12); these two butt ends 14 are substantially in register with each other once the weatherproof surround 9 is mounted in the bay 8; thus, the peripheral seal 10 is shaped as a "closed loop"; the central trunk 13 is thus shaped longitudinally to match the inside opening profile of the bay 8 in the vehicle 1 on which it is to be used;

a top reception slot 15 and a bottom reception slot 16; these slots 15 and 16 extend from one butt end 14 to the other (14) of the central trunk 13, substantially along a longitudinal elevation midplane XZ (shown in FIG. 7 in dashed lines); it can observed in FIGS. 6 to 8, in particular, that the top slot 15 is designed to receive the panel 5 to be weatherproofed, while the bottom slot 16 is designed to receive a portion of the wall 2 (fuselage 3, door 4, or another panel 5) that supports said panel 5 to be weatherproofed;

transversely on either side of the top reception slot 15, respectively an inside top confinement flange 17 and an outside top confinement flange 18; and transversely on either side of the bottom reception slot 16, the peripheral seal 10 has respectively, an inside bottom confinement flange 18 and an outside bottom confinement flange 19; the four flanges 17, 18, 19, and 20 co-operate with the central trunk 13 with which they are formed integrally so as to form a "cross-shaped" or "X-shaped" configuration as seen in the plane YZ;

as shown in FIGS. 6 and 14 in particular, an inside insertion recess 21 designed to receive an inside locking strip 11 is defined between the inside top confinement flange 17 and the inside bottom confinement flange 19; similarly, defined between the outside top confinement flange 18 and the outside bottom confinement flange 20, there is provided an outside insertion recess 22 for receiving an "outside" locking strip 11; although of approximately comparable profiles, the recesses 21 and 22 are not strictly of shapes complementary to the shapes of the locking strips 11 they are designed to receive: it can be understood that inserting each locking strip 11 into its recess 21 or 22 requires it to be forced into said recess 21 or 22, with some branches of the strip being elastically deformed momentarily;

the peripheral seal 10 is configured so that, over at least one of the confinement flanges 17-20, there extends a respective projecting ridge, e.g. 23-26; in embodiments of the invention, any particular peripheral seal 10 may typically have two or four such projecting ridges; in FIGS. 6-10, for example, the inside top confinement flange 17 carries an inside top projecting ridge 23, the outside top confinement flange 18 carries an outside top projecting ridge 24, the inside bottom confinement flange 19 carries an inside bottom projecting ridge 25, and finally the outside bottom confinement flange 20 carries an outside bottom projecting ridge 26; all of these projecting ridges 23-26 are designed to perform the same main function: in the normal operating state, a projecting ridge (23-26) is designed to hold one of the locking strips 11 in place by spring-clipping or snap-fastening; these projecting ridges 23-26, i.e. respectively bottom/top, and inside/outside ridges, extend substantially in elevation and longitudinally: these spring-clip projecting ridges 23-26 face one another in pairs (23 & 25 and 24 & 26) in elevation along the axis Z, on either side of respective ones of the insertion recesses 22 defined by the peripheral seal 10; and also in a peripheral seal 10 of the invention, each of the four confinement flanges 17-20 is connected to the central trunk 13 via a respective foldable shoulder (27-30). In FIG. 10, these shoulders 27-30 are outlined by zones that are shown in dashed lines, that are contiguous with the trunk 13, and that form the bases of the respective confinement flanges 17-20, the trunk 13 and said flanges 17-20 being formed integrally with said shoulders 27-30 and with the projecting ridges 23-26. In FIGS. 6-10, for example, the foldable shoulder 27 carries the projecting ridge 23, the foldable shoulder 28 carries the projecting ridge 24, the foldable shoulder 29 carries the projecting ridge 25, and, finally, the foldable shoulder 30 carries the projecting ridge 26. These foldable shoulders 27-30 extend generally along the longitudinal axis X, each of them extending between one of the reception slots (15-16) and one of the insertion recesses 21-22.

These shoulders 27-30 are said to be "foldable" shoulders because of their main function, namely to connect and to hinge the flanges 17-20 to the trunk 13, i.e. to unite the trunk 13 and the flanges (17-20) permanently, while also enabling the respective flanges 17-20 to fold.

This novel folding is carefully predetermined and implemented so as to achieve the major objectives of the invention, namely so as to make going from the normal operating state to the release state safe, simple, and very reliable.

This folding can be seen, for example, in FIG. 7, in which the foldable shoulder 29 (INT/INF) is subjected to elastic deformation that (in the release state) brings the flange 19 towards the top inside flange 17. In FIG. 9, the foldable shoulder 28 (SUP/EXT) is subjected to elastic deformation that (in the release state) brings the flange 18 towards the flange 20. The term "elastic deformation" is used to mean any substantial change in the shape of a structure, without major and permanent (e.g. crystalline) degradation, and thus with the structure returning to its initial position after said elastic deformation has been released. Conversely, the term "plastic deformation" is used when the deformation is such as to be permanent and therefore not reversible.

One of the specificities of the invention is that the arrangement makes provision for it to be possible for at least one of the confinement flanges (17-20) to move relative to the trunk 13 through a pivot angle 31 of about 90°, measured in a plane YZ perpendicular to the longitudinal direction X.

This pivot angle 31, resulting from a corresponding shoulder (27-30) being deformed in folding, brings one of the confinement flanges (17-20) towards a concave portion of the corresponding insertion recess 21-22, when it is desired to cause the weatherproof surround 32 to go from a normal operating state to a release state for releasing the jettisonable panel.

By making available a pivot angle 31 of at least 90°, as a result of its special geometrical shape, the seal 10 and thus more generally the weatherproof surround 32, guarantees that, in the release state, a desired wide and convenient passage is formed for ejecting the removable panel 5 (removing it from the bay 8). In other words, once in the release state, it is particularly easy to disunite and then to move apart the panel 5 and the wall 2 in which the movable panel 5 was installed or mounted in the normal operating state.

In addition, with the invention, going to the release state from the normal operating state is especially easy, fast, and safe, even if the operator is not very strong and/or is acting under difficult conditions (crash, injury, emergency, etc.).

As can be seen in FIG. 7, in the release state (after the "inside" locking strip 11 has been removed), and after the bottom inside confinement flange 19 has been folded back, the projecting ridge 25 of said folded-back flange 19 is in abutment against an abutment section 33 of the corresponding insertion recess 21. This abutment section 33 is situated substantially between the central trunk 10 and the confinement flange 17 that is also on the inside, i.e. that is opposite in elevation from the folded-back confinement flange 19. In other words, the flange 17 is opposite from the folded-back flange 19, across the recess 21.

In FIGS. 6, 10, 12, and 14, the peripheral seal 10 has four abutment sections, namely the inside top abutment section 33, an outside top abutment section 34, an inside bottom abutment section 35, and an outside bottom abutment section 36. In the example shown in FIG. 10, these abutment sections 33-36 are situated in register with the corresponding foldable shoulders 27-30, or indeed between them and the corresponding projecting ridges (23-26).

In the invention, the peripheral seal 10 satisfies the following two equations (equations No. 1):

$$\tfrac{1}{2} D2 \geq D3;\ \text{and}$$

$$\tfrac{1}{2} D2 \geq D4$$

In these equations No. 1, and as shown, in particular, in FIG. 6:

"D2" designates a maximum elevation half-dimension (measured along the axis Z) for the peripheral seal 10; typically, this maximum elevation half-dimension D2 extends from a center of inertia 37 (see FIGS. 8, 9, 14) of said seal 10 to the top (or bottom) tip of a respective one of the confinement flanges 17 & 18, 19 & 20 flanking the same (top or bottom) reception slot 15, 16;

"D4" designates a maximum transverse dimension of the peripheral seal 10, measured along the axis Y; this dimension D4 extends from a midplane XZ that subdivides a reception slot (either the top slot 15 or the bottom slot 16) into two equal and vertically symmetrical portions, to the distal elevation side (either the inside or the outside) of at least one of the top confinement flanges (17-18) or of at least one of the bottom confinement flanges (19-20); and "D3" designates a half-dimension D3 in elevation and outside the insertion recess of the peripheral seal 10; the half-dimension D3 outside the recess extends from a distal end (or tip) that is either a top end or a bottom end of a corresponding confinement flange 17-18; 19-20 which is opposite in elevation (Z) from the central trunk 13, to a distal end (opposite from the distal end of the corresponding flange, i.e. either the bottom end or the top end) of a projecting ridge (respectively 23-24; 25-26) formed by said confinement flange (17-18; 19-20); The distal end of each projecting ridge (23-24 or 25-26) forms the bottom or the top limit rim of the respective ones of the insertion recesses 21 and 22.

Another feature of the invention is that the peripheral seal 10 satisfies another relationship (equation No. 2), namely:

$$D2 \geq D5$$

In equation No. 2, and as shown, in particular in FIG. 6, "D5" designates a maximum elevation dimension of a reception slot 15 or 16. The dimension D5 is measured from the end wall of a reception slot, namely either the top slot 15 or the bottom slot 16, to a distal end (or tip) that is either the top end or the bottom end of a corresponding confinement flange 17-18; 19-20, which end is opposite in elevation (Z) from the central trunk 13.

In an embodiment of the invention, this dimension D5 is predetermined to be less, substantially by 5% to 10% of said dimensional value of D2, than a minimum elevation dimension or distance [P1–P2] of an insertion recess, namely either the inside recess 21 or the outside recess 22, between the two projecting ridges (respectively 23 & 25 or 24 & 26) of said insertion recess 21 or 22.

In this embodiment (FIG. 6), a minimum distance of the central trunk 13, i.e. a minimum folding dimension D1 for folding of said central trunk 13, is located between an abutment section (33-36) of one of the insertion recesses 21, and an end-wall surface 38 of a reception slot 15 or 16.

In this example, the value (e.g. in millimeters (mm)) of the dimension D1 is predetermined relative to the transversely narrower one of the reception slots (the bottom slot 16 or the top slot 15), and so that said dimension D1 is no greater than a transverse dimension D6 of said end-wall surface 38. In other embodiments, the value (e.g. in mm) of the dimension D1 is predetermined relative to the transversely wider one of the reception slots 15 and 16, or indeed relative to the width of both of them if the two slots 15 and 16 have the same width, so that the dimension D1 is no greater than the transverse dimension D6.

The minimum distance D1 may be predetermined to be no greater than one half of one of the transverse dimensions D6 of an end-wall surface 38 of the transversely wider reception slot (15 or 16).

It can also be seen in FIG. 6 that, substantially in the middle in elevation (Z) of the two inside and outside insertion recesses 21 and 22 (in certain embodiments, in the middle of only one of the two recesses 21 and 22), the central trunk 13 is provided with a clearance channel 39.

This clearance channel 39 extends longitudinally (along the axis X) from one butt end 14 to the other (14) of the central trunk 13. In a transverse elevation plane YZ, this clearance channel 39 has a concave rounded profile (with its concave side facing away from the center of inertia 37 of the trunk 13), which profile is substantially defined by a radius of curvature R1. In other words, the clearance channel 39 is in the form of a longitudinal trough. In this example, the dimension of this radius of curvature R1 satisfies the following relationship (equation No. 3):

$$[P3-P4] \geq 3 \times R1$$

where: [P3−P4] is an elevation distance between a top cusp P3 and a bottom cusp P4 in an inside or an outside insertion recess 21 or 22. Naturally, it is an insertion recess 21, 22 in which a clearance channel 39 is disposed. In this way, in the release state, the top and bottom cusps P3 and P4 remain substantially spaced apart from each other (P3 from P4, and P4 from P3) as can be seen in FIG. 7 showing the inside portion having a confinement flange 19 in the folded-back position. This spacing takes the form a clearance gap 40. Naturally, it is desired to minimize this clearance gap 40. In other words, the shape of the peripheral seal 10 is predetermined in order to impart substantially complementary shapes to the respective portions of the two confinement flanges (17 & 19 or 18 & 20) that are "folded-back" one on the other when one of said confinement flanges (17 or 19/18 or 20) is in the folded-back position.

In this folded-back position (FIG. 7), it can be observed that the spring-clip projecting ridge 25 of said insertion recess 21 is in abutment against the corresponding abutment section 33, thereby closing said clearance gap 40 (i.e. closing off its tip).

In some embodiments, the cusps P3 and P4 coincide substantially with respective ones of the bottom/top and inside/outside abutment sections (33-36).

In FIG. 8, four reception setbacks 41-44 can be seen, namely a top inside reception setback 41, a bottom inside reception setback 42, a top outside reception setback 43, and a bottom outside reception setback 44.

In this embodiment, the top or bottom projecting ridge 23-26 of the same insertion recess 21-22 is of outside profile, as seen in transverse elevation section YZ, that is complementary to the profile of a bottom or top reception setback 41-44. This reception setback 41-44 of the insertion recess 21-22 is located at the location of the corresponding abutment section 33 to 36, so as to space said section (33-36) apart from said projecting ridge 23-26. Thus, the invention provides a release state that is "compact", with an "increased" pivot angle 31, e.g. increased from 95° to 105°. The same substantially applies for the increased pivot angle 31, e.g. increased from 95° to 105°, shown in FIG. 9.

Another characteristic makes provision for at least one component material of said peripheral seal 10 to be chosen from the following materials (Table No. 1)

| K01 | NF L 17 151 | NF L 17 250 5 | NF L 17 261 | NF L 17 261 |
|---|---|---|---|---|
| K02 | Silicone elastomers Class 51 | Silicone rubbers Class 50 D 8 | Fluorosilicone rubbers Class 61 | Fluorosilicone rubbers Class 61 |
| K03 | 51 A 8 | 50 D 8 | 61 D 7 | 61 D 8 |
| K04 | 80 ± 5 | 80 ± 5 | 70 ± 5 | 80 ± 5 |
| K05 | 5 | 5 | 6 | 5.5 |
| K06 | 60 | 125 | 125 | 120 |
| K07 | / | 40 | 45 | 50 |
| K08 | / | −60 | −55 | −55 |
| K09 | −30° C. to +100° C. | −55° C. to +225° C. | −55° C. to +180° C. | −55° C. to +180° C. | where:

K01 indicates the designation of said material in a French Standard (NF);

K02 indicates the name of the material;

K03 indicates a code for said material;

K04 indicates a Shore A hardness value for said material;

K05 indicates a minimum tensile strength value (in (MPa) for said material;

K06 indicates a minimum breaking elongation value (in %) for said material;

K07 indicates a residual deformation after compression (after 70 hours at 100° C. in air, in %) for said material;

K08 indicates a non-brittle limit temperature value (in ° C.) for said material; and K09 indicates a range of temperatures for prolonged use.

This component material of the peripheral seal 10 is suitable not only for the peripheral seal 10 but also for the locking strips 11. In some embodiments, the peripheral seal 10 is a one-piece part formed by injection molding or by extruding an elastomer chosen from the following elastomers NF L 17 261 61D7, NF L 17 261 61D8, and NF L 17 250 5TBC. In some embodiments, the peripheral seal 10 is an assembly of a plurality of parts formed by injection molding or by extrusion, some of which parts (e.g. two rings 45-46 assembled together so as to leave a core cavity 47) are made of NF L 17 261 61D7, of NF L 17 261 61D8, or of NF L 17 250 5TBC. When (FIG. 13) a locking strip is provided with a blade-shaped rigid element 48, said element is, in general, made of other, more rigid, materials.

In FIGS. 6-10, 12 and 14, the peripheral seal 10 is a one-piece part, made by injection-molding and/or by extrusion, and made of a material that includes a silicone rubber of a class higher than 50 in compliance with a French Standard (NF), e.g. said material is the material designated by NFL17.250-5 or NFL17.261.

In FIG. 10, the outside locking strip 11 is made by molding a synthetic material directly over a blade-forming rigid element 48. This forms a locking strip 11 without a reception section 47 or 49.

For a locking strip 11 made up of a plurality of assembled-together components, as shown in FIG. 11, it is possible for at least one of the components (45 and/or 46) also to be made by being molded directly over a blade-forming rigid element 48.

In some embodiments of the invention, the weatherproof surround 32 is dimensioned and designed for a predetermined type of panel 5 that is jettisonable from a bay 8 in a wall 2 of a vehicle 1.

This weatherproof surround 32 has an envelope that is substantially prismatic. Its shape is mainly elongate along the longitudinal axis X, so as to form the two butt end faces 14.

This weatherproof surround 32 is also adaptable by longitudinal shaping to match various inside opening profiles of bays 8 for which it is to be used.

In FIGS. 6 to 10, the embodiments shown make provision for the peripheral seal 10 to be substantially symmetrical about a transverse elevation midplane YZ.

It can be observed that the peripheral seal 10 is also substantially symmetrical about a longitudinal transverse midplane XY. In this example, each of the two locking strips 11, respectively an inside strip and an outside strip, has a profile that is substantially complementary to the profile of the corresponding insertion recess 21-22, e.g. with a profile that is symmetrical about said longitudinal transverse midplane XY. It should be noted that, just like the peripheral seal 10, each of these two locking strips 11 is formed as a one-piece part.

In FIGS. 7 to 13, the substantially complementary profile of the insertion recess 21-22 and thus of each of the locking strips 11 is, in the transverse elevation plane YZ (the plane of the sheets), comparable to a T-shape.

The transversely extending leg of the T-shape is defined by the clearance channel 39 or by the corresponding convex shape of the strip 11, while the crossbar (extending in elevation) of the T-shape is defined by mutually flush distal portions of the inside flanges 17-19 or of the outside flanges 18-20, or by the distal portion (opposite from the clearance channel 39) of each of the locking strips 11.

In addition, in particular in these embodiments, conventional-type strip extraction systems (strap 12 or the like), e.g. comparable to the systems shown in FIGS. 3-5, are adaptable to the invention.

Figure 12:
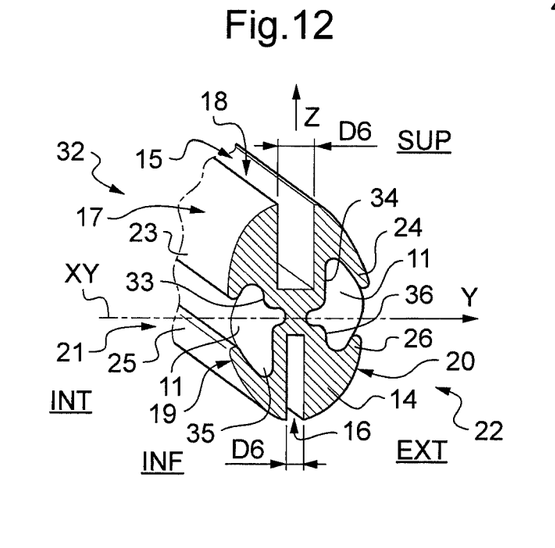
FIG. 12 is a diagrammatic view of an "asymmetrical" embodiment of a weatherproof surround of the invention, in longitudinal perspective from a transverse elevation plane, with on the right (outside) a top confinement flange that is "short" while a bottom confinement flange is "long"; on the left (inside), a top confinement flange is "long" while a bottom confinement flange is "short"; on either of the inside and outside sides, a "wide" locking strip is mounted between respective ones of said confinement flanges, thereby locking the weatherproof surround in the normal operating state.

Conversely, in the embodiment shown in FIG. 12, a weatherproof surround 32 is shown in which the peripheral seal 10 is substantially asymmetrical about a longitudinal elevation midplane XZ and about a longitudinal transverse midplane XY. In this example, the peripheral seal 10 is asymmetrical (opposite ways up) and formed with an inside insertion recess 21 in which a top projecting ridge 23 is closer to said midplane XY than is the bottom projecting ridge 25 of the same inside insertion recess 21.

Also in this example, the outside insertion recess 22 has a bottom projecting ridge 26 that is closer to said midplane XY than is the top projecting ridge 24 of the same insertion recess 22.

Thus, the two locking strips 11, respectively the inside strip and the outside strip, are of profiles that are substantially complementary with the corresponding insertion recesses 21-22, and thus opposite ways up. Typically, the inside one of these two asymmetric locking strips 11 (the strip received in the recess 21) has a transverse elevation (YZ) profile that is rounded with a longer bottom portion, and the outside of one of said strips 11 (the strip received in the recess 22) has a transverse elevation profile that is rounded with a longer top portion.

It can be seen in FIGS. 6-10 that, in a weatherproof surround 32, one or indeed both of the locking strips 11 is made as a single piece by being integrally injection-molded, typically out of a material having a Shore A hardness value that is greater than 70 or indeed greater than 80 in compliance with a French Standard (NF), e.g. said material is the material designated by NFL17.250-5 or NFL17.261.

Figure 13:
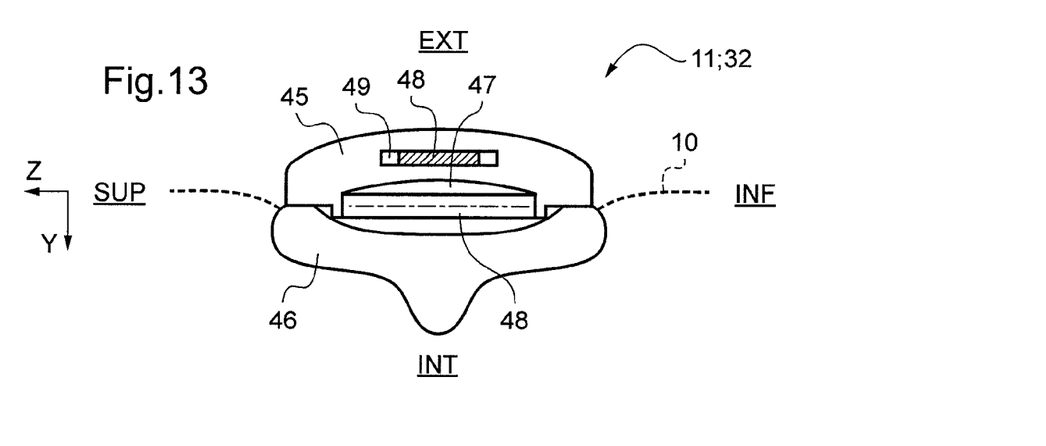
FIG. 13 is a diagrammatic view of another multi-component assembly embodiment forming a "stiffened" locking strip for a weatherproof surround of the invention, similar to FIG. 11, this locking strip having an inside concave half-ring having fastener means and an outside convex other half-ring having fastener means that are complementary to the fastener means of the inside concave half-ring, this locking strip also having a stiffener blade (e.g. made of a metal such as aluminum and/or of a composite material such as carbon fibers and a binder and/or of a plastics material such as polycarbonate), received in an inside longitudinal cavity that is defined by and between the two half-rings, one of which is an inside concave half-ring and the other of which is an outside convex half-ring.

In FIGS. 11 and 13, in a weatherproof surround 32, one or indeed both of the locking strips 11 comprises two rings 45-46, namely a distal ring and a proximal ring, which rings are assembled together so as to leave a core cavity 47. The distal and proximal rings 45 and 46 are assembled together by being spring-clipped together. In this embodiment, an extractor grip 50 is provided firstly for disuniting the distal ring 45 from the proximal ring 46, and then for detaching the entire locking strip 11 from its insertion recess 21-22.

In FIG. 13, the locking strip 11 that includes a concave core cavity 47 is such that a rigid element 48 is disposed in said core cavity 47. In some embodiments, both of the strips 11 of a weatherproof surround 32 are formed in this manner. Rigid elements 48 also exist that are made up of a plurality of component parts, e.g. two or three portions, all of which are disposed in the core cavity 47.

In this example (FIG. 13), the rigid element 48 is in the form of a blade and is incorporated in the core cavity 47, substantially from one butt end face 14 to the other (14) of the weatherproof surround 32.

As mentioned above, in a core cavity 47 (referred to as a "peripheral" cavity, i.e. extending from one butt end face 14 to the opposite butt end face 14 of the weatherproof surround 32), a locking strip 11 may have a plurality of rigid elements 48, some of which (see FIG. 13, inside the distal ring 45) are disposed in one or more reception sections, like the section referenced 49, that are distinct from said core cavity 47.

Assuming the weatherproof surround 32 is lying in the installation plane, i.e. in the general plane of the bay 8, such reception sections 49 are distributed around its periphery. For example, FIG. 2 shows the reception sections 49 arranged along substantially rectilinear portions of the concave core 47, while curved portions 51, typically corresponding to corners of jettisonable panel 5, are exempt from rigid elements 48.

In particular, at least one of the curved portions of the core cavity 47 coincides with an initiator zone 52 (FIG. 2) for initiating jettisoning of the window.

In FIG. 13 the multi-component assembly forming a "stiffened" locking strip 11 is designed for a weatherproof surround 32 of the invention. This strip is generally similar to the FIG. 11 strip but it has a distal ring 45 that has fastener means and a proximal ring 46 that has fastener means that are complementary to the fastener means of the distal ring 45.

This locking strip 11 also has an element 48 that forms a stiffener blade, and that, in this example, is made of a metal such as aluminum and/or of a composite material such as carbon fibers and a binder and/or of a plastics material such as polycarbonate. This element 48 is received in the internal longitudinal core cavity 47 defined between the rings 45-46.

Just like in other embodiments, the locking strip 11 of FIG. 13 has a general profile, seen in transverse elevation (YZ) that is comparable to a T-shape, having its crossbar extending substantially along the elevation axis Z.

In a weatherproof surround 32 of the invention, it is possible to interchange the various models and shapes of locking strip 11 and of peripheral seal 10 with one another. Thus, the locking strip 11 of FIG. 13 or the locking strip of FIG. 11 may be mounted in either of the insertion recesses (21 or 22) of a peripheral seal 10 formed as shown in any one of FIG. 6-10 or 14.

The invention makes it possible to increase the pivot angle 31 through which the confinement flange (17-20) can deform, thereby fully vacating the passage provided for panel 5, which means that the ejection force can be reduced significantly, without reducing the strength of the panel 5 in withstanding the aerodynamic forces while the vehicle 1 is operating (e.g. while it is in flight), and over the entire temperature range. The invention thus makes it possible to guarantee that the weatherproof surround 32 behaves constantly over a temperature range from −40° C. to +55° C.

In order to obtain a jettisoning force that is constant over the temperature range −40° C. to +55° C., the invention makes the weatherproof seal 32 of elastomers, e.g. silicone instead of products of the "rubber" type that are used in known techniques. For known peripheral seals, materials in compliance with NF31B7 or a neoprene 370 have been used, while, for a locking strip of known-type, conventionally a material in compliance with NF80G is used.

The elastomer that is suitable for the invention is chosen to have Shore hardness of in the range 60 to 90 on the Shore A scale. In order to compensate for the potential loss of stiffness of the weatherproof surround 32 of the invention, since it is made of silicone rubber rather than rubber as it is in the prior art, various solutions are proposed for any given geometrical shape of the invention:

using a silicone elastomer of greater hardness; and/or increasing the depths of the reception slots 15-16 (respectively receiving the wall 2 and the panel 5, e.g. a window), in order to increase the amounts of overlap, while thickening the weatherproof surround 32 and while increasing its stiffness.

For information, the invention makes it possible to reduce the jettisoning force. In order to obtain a jettisoning force reduced to 24.95 decanewtons (daN), the definition of the invention delays as long as possible the time at which the deformed/moving confinement flange 17-20 comes into contact with the opposite/stationary confinement flange 17-20 and significantly increases the pivot angle 31 formed by said deformed confinement flange 17-20 relative to its initial position (in the normal operating state).

The specific geometrical shape of the novel peripheral seal 10, and thus of the weatherproof surround 32 of the invention is described above. Various criteria specific to the invention distinguish it from the prior art.

One of the criteria consists in making provision for the confinement flange (17-20) or "moving lip" that is pressed against the panel 5 or window to be folded back towards the confinement flap (17-20) or "stationary lip" that is pressed against the wall 2 or fuselage 3 through a fold-back pivot angle 31 that is sufficient to allow the panel 5 to pass through freely on being ejected or jettisoned.

In particular, this means having a potential pivot angle 31 that enables the confinement flange (17-20) to pivot through more than 90°. Thus, this confinement flange (17-20) is retracted fully out of the path along which the panel 5 passes on being jettisoned. Simultaneously, the weatherproof surround 32 in the release state no longer applies any retaining force transversely (Y) between the panel 5 and the wall 2.

The invention achieves this by making provision for the dimension D3 and the dimension D4 to be less than or equal to ½D2, while preventing the facing projecting ridges (23-26) or lugs from meeting before the pivot angle 31 reaches 90°.

In comparison with known techniques, another criterion is the "widening" of the locking strip 11, i.e. the proportional increase in the maximum elevation direction (Z) of said strip 11 and thus of the insertion recess 21-22 that receives it. This criterion makes it possible to space the projecting ridges (23-26) or lugs apart so as to increase the pivot angle 31 when the strip 11 is removed from its recess 21-22, thereby also improving the strength with which the panel 5 is held in the wall 2 in the normal operating state, i.e. under "static" conditions.

By choosing to increase the dimension or depth D5 of the slots or channels, the dimension D2 is increased, and the condition D4<½D2 is satisfied.

The dimension D1 must be minimized to give flexibility to the deformed "foldable shoulder" zone (27-30) and so as to enable the moving confinement flange (17-20) to be folded back, but it should not be too small in order to prevent the peripheral seal 10 from tearing under the aerodynamic forces in the normal operating state.

The radius of curvature R1 of the clearance channel 39 is increased in order to increase the spacing in elevation between the facing projecting ridges (23-26), and thus in order to increase the distance [P3–P4]. This makes it possible, in particular, for the moving confinement flange (17-20) to move, subject to the facing projecting ridges (23-26) not meeting before the moving confinement flange (17-20) has traveled its minimum 90° stroke.

Operation during jettisoning of the weatherproof surround 32 of the invention, i.e. going from the normal operating state to the release state, is described below. The weatherproof surrounds 32 of the embodiments of the invention that are shown make it possible selectively either to jettison the removable panel 5 from the inside towards the outside of the vehicle 1 by pushing transversely from left to right on said panel 5, or to jettison said panel from the outside towards the inside by pushing from right to left on said panel 5. For jettisoning the panel from the inside of the vehicle 1, it is an inside confinement flange (17-19) that is moved through the pivot angle 31. Conversely, for jettisoning the panel from the outside of the vehicle 1, it is an outside confinement flange (17-19) that is moved through the pivot angle 31.

In FIGS. 6 to 14, the specificities of the invention, including the dimensioning of the component parts, both enable the pivot angle 31 to be larger than in known techniques, and also make it possible to push the panel 5 with a smaller force (while remaining within the range of forces recommended by the certification authorities). It should be noted that this jettisoning and deformation principle is symmetrical (except in FIG. 12) in the event of jettisoning the panel 5 from the outside towards the inside by pushing on said panel 5.

It is also possible, by means of the invention, to jettison the panel from the outside towards the outside, by pulling on said panel: this can apply, for example, to a helicopter window such as for a Eurocopter EC225 model or for a Eurocopter EC155B1-VIP model.

In predetermining the embodiments of the invention, pre-dimensioning makes it possible to observe the following values (Table No. 2):

| MODEL | FORCE (N) | D5 (mm) | Deformation Ux (mm) | STIFFNESS K (N/mm) | GAIN Ux Max | GAIN k Assembly |
|---|---|---|---|---|---|---|
| TEST 03 | 2.5 | 13.8 | 4.26 | 0.587 | 13.9(%) | +16.2(%) |

By increasing the slot depth D5, the out-of-plane deformation, referenced "Ux" decreases, thereby increasing stiffness of the assembly and improving the strength of the assembly under load. This novel geometrical shape makes it possible to increase the depth of the reception slot (15 or 16), the geometrical shape of this design thus presenting an assembly stiffness gain of about 16% (referenced "Gain k" and indicated as a percentage ("%") of the stiffness "K") in the example of an increase in the depth (D5) of the reception slot (15 or 16) of about 72%. It can be concluded that, under an identical loading force, the invention achieves an increase in the stiffness of the weatherproof surround 32. The strength of this weatherproof surround 32 is thus not only equivalent to the strength of current jettison seals, but rather it is also significantly greater.

For the main properties of the materials of the strips 11 or of the seals 10, it is common in current techniques to use a material in compliance with NF L 17 131.

Thus, in Table No. 1, the materials listed indicate a trend for the characteristics of materials suitable for finally defining the weatherproof surround 32 of the invention. The exact and final grade of material is, in practice, selected depending on the specific manufacturing requirements.

The invention is totally interchangeable with current jettison seals. Thus, the invention makes it possible, by retrofitting, to improve the level of safety required for vehicles 1 that are already in service, and in particular for helicopters.

In a variant of the invention, by changing the material of the locking strips 11, the increase in their hardness index makes it possible to increase the allowable load on the peripheral seal 10. This variant makes it possible to improve the strength with which the panel 5 is mounted in the peripheral seal 10 in a wall 2, better enabling it to withstand the effect of aerodynamic pressure (or suction).

In a variant of the invention (FIG. 13), in order to improve the allowable load for the entire weatherproof surround 32, it is possible to increase the stiffness of the locking strip 11, beyond the stiffnesses achievable merely by altering the component material thereof, by incorporating at least one rigid element 48 or additional rigid part in the body of the strip 11. In FIG. 13, the locking strip 11 is subdivided into a plurality of components, between which the rigid element 48 is interposed.

Depending on the embodiment, this type of rigid element 48 interposed between the distal ring 45 and the proximal ring 46 of the strip 11 is made of aluminum and/or of (glass fiber or carbon fiber) composite and/or of polycarbonate.

In some embodiments, a rigid element 48 extends all the way around the locking strip 11 and thus all the way around the removable panel 5.

In other embodiments, a plurality of rigid elements 48 are incorporated in the locking strip 11 in a manner such as to be distributed and thus to impart dedicated stiffening to preferred locations. Thus, the main zones such as certain corners or bends of the locking strip 11 are stiffened due to them receiving rigid elements 48. In certain embodiments, other zones, exempt from such rigid elements 48, are used to initiate jettisoning of the panel 5, thereby contributing to increasing its mounting rigidity and thus to increasing its strength under the effect of aerodynamic loading. The bends at the corners of the panel 5 that are used for initiating jettisoning remain free of any rigid element 48. Regardless of which solution is chosen, the rigid element(s) 48 must be shaped in a manner suitable for matching the geometrical shape of each panel 5.

In order to improve the allowable load on the weatherproof surround 32 as a whole, by acting on the allowable load on the strip 11, and in order to achieve stiffnesses beyond the stiffnesses achievable merely by altering the component material, it is possible to incorporate one or more rigid elements, by making them in situ by directly casing or injecting a sealant and/or an adhesive into the core cavity 47.

Depending on the embodiment, the entire core cavity 47 is filled with a single rigid element 48, or spaces without any rigid element 48 are left in the core cavity 47 between at least two butt ends of rigid elements 48 or between rigid elements 48.

In some embodiments, one or more rigid elements 48 inserted in the locking strip 11 are at least partially made of aluminum and/or of a composite material (e.g. glass fiber or carbon fiber) and/or of polycarbonate.

Regardless which solution is chosen, a weatherproof surround 32 has either a single rigid element 48, e.g. extending all the way around the panel 5, or a distribution of a plurality of rigid elements 48 at preferred locations along the core cavity 47. One embodiment provides another and distinct reception section 49 in the distal ring 45. Such a section 49 also receives one or more rigid elements 48 at one or more preferred locations therealong.

In some embodiments, after each rigid element 48 has been inserted into the locking strip 11 and then cemented after injecting or casting a sealant or an adhesive, each locking strip 11 is pre-shaped to match the profile of the panel 5 for which it is to be used, thereby facilitating installation.

The bends at the corners of the panel 5 that are used for initiating jettisoning remain free of any rigid element 48. All of the bends remain free of any rigid element 48 in embodiments in which it is desired for the weatherproof surround 32 to be especially flexible, in particular in order to facilitate mounting locking strips 11 in the peripheral seal 10 for which they are to be used.

In the variant shown in FIG. 14, the peripheral seal 10 has projecting ridges (23-26) or "lips" that are particularly long on either side of the insertion recesses 21-22 receiving the locking strips 11. This makes it possible to improve the strength with which the locking strips 11 are held in the seal 10 once they are put in place. However, it can be more difficult to install the strips 11.

In FIG. 14, it can be understood that, in the release state (depending on the confinement flange 17-20 that is moved):

the projecting ridge 23 (inside top ridge) comes to be received in the reception setback 42 (inside bottom setback);

the projecting ridge 24 (outside top ridge) comes to be received in the reception setback 44 (outside bottom setback);

the projecting ridge 25 (inside bottom ridge) comes to be received in the reception setback 41 (inside top setback); and the projecting ridge 26 (outside bottom ridge) comes to be received in the reception setback 43 (outside top setback).

By means of the ridges being received in this way in the reception setbacks 41-44, it is easy for the invention to procure the minimum 90° of pivoting for the moving confinement flange 17-20 during jettisoning of the panel 5.

Some advantages of the invention are mentioned below.

By means of the invention, it is easy to solve the problem of certification that is sometimes encountered with certain existing devices that require forces of greater than 24.95 daN to be applied at ambient temperature (in the range 20° C. to 30° C.). In prior art examples, forces are sometimes greater than 80 daN at low temperature.

The invention makes it possible to de-correlate the stiffness of the panel 5 from the function and from the jettison force of the composition.

A weatherproof surround 32 of the invention is totally interchangeable with known jettison seals. Thus, the invention makes it possible to establish an improved level of safety for vehicles 1 already in service.

Naturally, numerous implementation variations may be made to the present invention. Although several embodiments are described above, it can readily be understood that it is not conceivable to identify exhaustively all of the possible embodiments. Naturally, it is possible to replace any described component with equivalent means without going beyond the ambit of the present invention.

What is claimed is:

1. A peripheral seal designed for a weatherproof surround for a removable panel that is removable from a bay in a wall of an aircraft, said peripheral seal being of the generally tubular type and extending mainly along a longitudinal axis (X), and comprising at least: a central trunk of substantially prismatic shape, mainly elongate along the longitudinal axis (X) so as to form two butt ends, and adaptable by longitudinal shaping to match an inside opening profile of the bay, a top reception slot and a bottom reception slot, which slots extend from one butt end to the other butt end of the central trunk, substantially along a longitudinal elevation midplane (XZ); transversely on either side of the top reception slot, respectively an inside top confinement flange and an outside top confinement flange, and transversely on either side of the bottom reception slot, respectively an inside bottom confinement flange and an outside bottom confinement flange; defined between the inside top confinement flange and the inside bottom confinement flange, an inside insertion recess for an inside locking strip, and, defined between the outside top confinement flange and the outside bottom confinement flange, an outside insertion recess for an outside locking strip; on each confinement flange, a projecting ridge for spring-clipping one of the locking strips, which ridge extends substantially in longitudinal elevation, these projecting ridges being arranged in pairs of mutually facing ridges on either side in elevation of respective ones of the insertion recesses; and, connecting each of the four confinement flanges to the central trunk, a respective longitudinal foldable shoulder; wherein said peripheral seal provides a pivot angle of at least 95° in a plane (YZ) that is perpendicular to the longitudinal axis (X), through which angle one of the confinement flanges can be folded back by the corresponding foldable shoulder deforming towards a concave portion of the corresponding insertion recess, from a normal operating state to a release state for releasing the removable panel while the remaining confinement flanges remain undeformed; in the release state, the projecting ridge of the folded-back confinement flange being in abutment against an abutment section of the corresponding insertion recess, which abutment section is situated substantially between the central trunk and the associated confinement flange that is opposite from the folded-back confinement flange.

2. A peripheral seal according to claim 1, wherein said peripheral seal satisfies a relationship relating a maximum elevation half-dimension D2 of the peripheral seal, a maximum transverse half-dimension D4 of the peripheral seal, and a half-dimension D3 out of the insertion recess in elevation of said peripheral seal, the half-dimension D3 out of the recess extending between a distal end that is either a top end or a bottom end of a corresponding confinement flange that is opposite in elevation from the central trunk and a distal end of a projecting ridge formed by said confinement flange, this relationship between elevation half-dimension D2, transverse half-dimension D4, and half-dimension D3 outside the recess being such that: ½ D2 is greater than or approximately equal to D3, and ½ D2 is greater than or approximately equal to D4.

3. A peripheral seal according to claim 1, wherein the peripheral seal satisfies a relationship such that:

$$D2 \geq D5$$

where D2 is a maximum elevation half-dimension of the peripheral seal and D5 is a maximum elevation dimension of a reception slot, said dimension D5 being less, by 5% to 10% of D2, than a minimum elevation dimension or distance of an insertion recess, between the two projecting ridges of said insertion recess.

4. A peripheral seal according to claim 1, wherein a minimum distance D1 of the central trunk, between an abutment section of the insertion recess and an end-wall surface of the transversely narrower reception slot, which slot is either the bottom slot or the top slot, is no greater than a transverse dimension D6 of said end-wall surface, and/or the minimum distance D1 is no greater than one half of a transverse dimension D6 of an end-wall surface of the other reception slot, which other slot is either the top slot or the bottom slot, is the transversely wider slot, and is opposite in elevation from the narrower reception slot.

5. A peripheral seal according to claim 1, wherein, substantially in the middle in elevation of at least one insertion recess, namely either the inside recess or the outside recess, the central trunk is provided with a clearance channel, extending longitudinally from one butt end to the other of the central trunk, said clearance channel having, in a transverse elevation plane (YZ), a concave rounded profile that is substantially defined by a radius of curvature R1; the dimension of said radius of curvature R1 satisfying the following relationship:

$$D8 \geq 3 \times R1$$

where: D8 is an elevation distance between a top cusp P3 and a bottom cusp P4 of an insertion recess that is either the inside or the outside recess, in which insertion recess said clearance channel is disposed, so that, in the release state, the cusps, respectively the top cusp and the bottom cusp, remain significantly spaced apart from each other while the spring-clip ridge of said insertion recess is in abutment against the corresponding abutment section.

6. A peripheral seal according to claim 1, wherein at least one projecting ridge, respectively the top ridge or the bottom ridge, of the same insertion recess is of outside profile, as seen in transverse elevation section, that is complementary to a respectively bottom or top reception setback, this reception setback of the insertion recess being located at the location of the corresponding abutment section so as to space said abutment section apart from said projecting ridge, and thus so as to make it possible for a pivot angle having a value between 95° and 105°, to be procured by means of a compact release state.

7. A peripheral seal according to claim 1, wherein said peripheral seal is a one-piece part, made by injection-molding, by extrusion, or by a combination of injection-molding and extrusion, and made of a material that includes a silicone rubber of class higher than 50 in compliance with a French Standard, NF, wherein said material is the material designated by NFL17.250-5 or NFL17.261.

8. A weatherproof surround for a removable panel that is removable from a bay in a wall of an aircraft, said weatherproof surround being substantially prismatic, mainly elongate along a longitudinal axis (X) so as to form two butt end faces, and adaptable by longitudinal shaping to match an inside opening profile of the bay in which it is to be used, wherein said weatherproof surround has at least one peripheral seal according to claim 1.

9. A weatherproof surround according to claim 8, wherein at least one component material of said peripheral seal, the locking strip, or both the peripheral seal and the locking strip is chosen from the following materials:

| K01 | NF L 17 151 | NF L 17 250 5 | NF L 17 261 | NF L 17 261 |
|---|---|---|---|---|
| K02 | Silicone elastomers Class 51 | Silicone rubbers Class 50 D 8 | Fluorosilicone rubbers Class 61 | Fluorosilicone rubbers Class 61 |
| K03 | 51 A 8 | 50 D 8 | 61 D 7 | 61 D 8 |
| K04 | 80 ± 5 | 80 ± 5 | 70 ± 5 | 80 ± 5 |
| K05 | 5 | 5 | 6 | 5.5 |
| K06 | 60 | 125 | 125 | 120 |
| K07 | / | 40 | 45 | 50 |
| K08 | / | −60 | −55 | −55 |
| K09 | −30° C. to +100° C. | −55° C. to +225° C. | −55° C. to +180° C. | −55° C. to +180° C. | where:
K01 indicates the designation of said material in a French Standard, NF;
K02 indicates the name of the material;
K03 indicates a code for said material;

K04 indicates a Shore A hardness value for said material;

K05 indicates a minimum tensile strength value, in MPa, for said material;

K06 indicates a minimum breaking elongation value, in %, for said material;

K07 indicates a residual deformation after compression, after 70 hours at 100° C. in air, in %, for said material;

K08 indicates a non-brittle limit temperature value, in ° C., for said material; and K09 indicates a range of temperatures for prolonged use.

10. A weatherproof surround according to claim 8, wherein the peripheral seal is substantially symmetrical about a longitudinal elevation midplane, or about a longitudinal transverse plane, each of the two locking strips, respectively the inside strip and the outside strip, having a profile that is substantially complementary to the profile of the corresponding insertion recess, the inside strip and the outside strip having a profile that is symmetrical about said longitudinal transverse plane.

11. A weatherproof surround according to claim 8, wherein at least the peripheral seal is substantially asymmetrical about a longitudinal elevation midplane, a transverse elevation midplane, or both the longitudinal elevation midplane and the transverse elevation midplane, the assymetrical peripheral seal being formed with an inside insertion recess in which a top projecting ridge is closer than the bottom projecting ridge of the same inside insertion recess, while an outside insertion recess has a bottom projecting ridge that is closer than the top projecting ridge of the same insertion recess, two locking strips, respectively an inside strip and an outside strip, being of profiles substantially complementary to the corresponding insertion recesses, with transverse elevation profiles that are rounded, respectively with a longer bottom portion and with a longer top portion.

12. A weatherproof surround according to claim 8, wherein at least one locking strip is made as a single piece by injection-molding, by extrusion, or by a combination of injection-molding and extrusion, and made of a material having a Shore A hardness value that is greater than 70 in compliance with a French Standard, NF, wherein said material is the one designated by NFL17.250-5 or NFL17.261.

13. A weatherproof surround according to claim 8, wherein at least one locking strip has a concave core cavity in which at least one rigid element is disposed, the at least one rigid element provided by a blade-forming rigid element, incorporated in the core cavity of said locking strip, substantially from one butt end to the other end of said weatherproof surround, the locking strip entirely surrounding and enclosing a periphery of the at least one rigid element.

14. A weatherproof surround according to claim 8, wherein at least one locking strip encloses a plurality of rigid elements distributed around a periphery of the weatherproof surround arranged in substantially rectilinear portions of the locking strip, while curved portions of the locking strip corresponding to corners of removable panel are exempt from rigid elements, at least one of the curved portions coinciding with an initiator zone for initiating jettisoning of the panel.

15. An aircraft provided with at least one wall that defines a bay for a removable panel, said panel being connected to said wall by a weatherproof surround that has at least one peripheral seal according to claim 1, wherein said aircraft is a rotary-wing aircraft, the wall being part of a fuselage or of a door, the removable panel being a window or a hatch, and the weatherproof surround being interchangeable, or forming a weatherproof surround for replacing a distinct surround.

16. A peripheral seal designed for a weatherproof surround for a panel that is removable from a bay in a wall of an aircraft, the seal comprising:
a central trunk extending along a longitudinal axis (X) and having two butt ends, and adapted to correspond with an inside opening profile of the bay,
an inside top confinement flange and an inside bottom confinement flange extending from the central trunk via inside top and bottom folding shoulders respectively, the inside top and bottom confinement flanges defining an inside insertion recess for an inside locking strip;
an outside top confinement flange and an outside bottom confinement flange extending from the central trunk via outside top and bottom folding shoulders respectively, the outside top and bottom confinement flanges defining an outside insertion recess for an outside locking strip;
wherein the inside top confinement flange and the outside top confinement flange define a top reception slot therebetween extending between the butt ends of the central trunk, substantially along a longitudinal elevation midplane (XZ);
wherein the inside bottom confinement flange and the outside bottom confinement flange define a bottom reception slot therebetween extending between the butt ends of the central trunk, substantially along a longitudinal elevation midplane (XZ);
wherein each confinement flange has a projecting ridge adapted to spring-clip an associated locking strip, the projecting ridges being arranged in pairs of mutually facing ridges on either side of respective insertion recesses;
wherein said peripheral seal provides a pivot angle of at least 95° between the trunk and one of the confinement flanges when the corresponding folding shoulder is folded to deform the one of the confinement flange towards a concave portion of the corresponding insertion recess from a normal operating state to a release state for releasing the removable panel such that the corresponding projecting ridge of the folded confinement flange is abutting an abutment section of the opposed folding shoulder of the corresponding insertion recess and the remaining three confinement flanges are undeformed.

17. The seal of claim 16 wherein the pivot angle of at least ninety degrees is formed between the longitudinal elevation midplane (XZ) at the central trunk and a surface of the corresponding folded confinement flange defining the corresponding reception slot.

18. The seal of claim 16 wherein D8 is an elevation distance between projecting ridges of one of the insertion recesses; and
wherein D8 is greater than a height of the trunk taken along the longitudinal elevation midplane (XZ) between the top and bottom reception slots such that the seal is elongated.

19. The seal of claim 16 wherein the seal is symmetric about the longitudinal elevation midplane (XZ) and longitudinal transverse midplane (XY).

20. A peripheral seal according to claim 1, wherein the pivot angle of at least ninety degrees is formed between the longitudinal elevation midplane (XZ) at the central trunk and the corresponding folded confinement flange.

\* \* \* \* \*